United States Patent
Tse et al.

(10) Patent No.: US 6,850,952 B2
(45) Date of Patent: Feb. 1, 2005

(54) METHOD AND APPARATUS FOR POPULATING MULTIPLE DATA MARTS IN A SINGLE AGGREGATION PROCESS

(75) Inventors: Eva Man-Yan Tse, Sunnyvale, CA (US); Michael Dean Lore, Katy, TX (US); James Daniel Attaway, Katy, TX (US)

(73) Assignee: Computer Associates Think, Inc., Islandia, NY (US)

( * ) Notice: Subject to any disclaimer, the term of this patent is extended or adjusted under 35 U.S.C. 154(b) by 117 days.

(21) Appl. No.: 09/939,560

(22) Filed: Aug. 28, 2001

(65) Prior Publication Data

US 2002/0078018 A1 Jun. 20, 2002

Related U.S. Application Data

(63) Continuation of application No. 09/317,773, filed on May 24, 1999, now Pat. No. 6,282,544.

(51) Int. Cl.[7] .............................................. G06F 17/30
(52) U.S. Cl. ...................... 707/102; 707/10; 707/101; 707/103; 707/104
(58) Field of Search ............................... 707/3, 1, 2, 5, 707/8, 6, 10, 100, 101, 102, 103, 104; 705/10

(56) References Cited

U.S. PATENT DOCUMENTS

| | | | | |
|---|---|---|---|---|
| 5,778,350 A | * | 7/1998 | Adams et al. ................. | 707/1 |
| 5,794,246 A | * | 8/1998 | Sankaran et al. ........... | 707/101 |
| 5,799,300 A | * | 8/1998 | Agrawal et al. ............... | 707/5 |
| 5,832,475 A | * | 11/1998 | Agrawal et al. ............... | 707/2 |
| 5,890,154 A | * | 3/1999 | Hsiao et al. ................... | 707/8 |
| 5,905,985 A | * | 5/1999 | Malloy et al. .............. | 707/100 |
| 5,960,435 A | * | 9/1999 | Rathmann et al. .......... | 707/101 |
| 5,978,788 A | * | 11/1999 | Castelli et al. ................. | 707/2 |
| 5,983,224 A | * | 11/1999 | Singh et al. ................... | 707/6 |
| 6,014,670 A | | 1/2000 | Zamanian et al. .......... | 707/101 |
| 6,032,158 A | * | 2/2000 | Mukhopadhyay et al. .. | 707/201 |
| 6,061,658 A | * | 5/2000 | Chou et al. ................... | 705/10 |
| 6,078,918 A | * | 6/2000 | Allen et al. ................... | 707/6 |
| 6,078,924 A | * | 6/2000 | Ainsbury et al. ........... | 707/101 |
| 6,189,004 B1 | * | 2/2001 | Rassen et al. ................. | 707/3 |
| 6,377,993 B1 | * | 4/2002 | Brandt et al. ............... | 709/227 |
| 6,714,979 B1 | * | 3/2004 | Brandt et al. ............... | 709/225 |

* cited by examiner

*Primary Examiner*—Thuy N. Pardo
(74) *Attorney, Agent, or Firm*—Steven B. Kelber; Piper Rudnick LLP

(57) ABSTRACT

A method of populating multiple data marts in a single operation from a set of transactional data held in a database in a single aggregation process, in which aggregate values are calculated only once, a determination is made as to which output data marts required the aggregate value, and the aggregate values are output to the appropriate data marts. Dimension data associated with the output aggregate records is also output to the appropriate data marts.

26 Claims, 5 Drawing Sheets

METHOD AND APPARATUS FOR POPULATING MULTIPLE DATA MARTS IN A SINGLE AGGREGATION PROCESS

This application is a continuation of application Ser. No. 09/317,773 Filed on May 24, 1999, now U.S. Pat. No. 6,282,544.

BACKGROUND OF THE INVENTION

This patent application relates to a methodology for populating data marts.

A data mart is a database, or collection of databases, designed to help managers make strategic decisions about their business. Whereas a data warehouse combines databases across an entire enterprise, data marts are usually smaller and focus on a particular subject or department. Often, data marts are subsets of larger data warehouses. Planning and Designing The Data Warehouse edited by Ramon Barquin and Herb Edelstein. Prentice Hall PTR. ISBN 0-13-255746-0 describes definitions and the usage of data marts. The Data Warehouse Toolkit by Ralph Kimball. John Wiley & Sons, Inc. ISBN 0-471-15337-0 provides a good description of the background and concepts of data warehousing.

One of the first steps in building a successful data mart is to correctly identify the different dimensions and the fact set within a business structure. This is often known as dimension modeling. Each dimension represents a collection of unique entities that participate in the fact set independent of entities from another dimension. The fact set usually contains transactional data where each transaction (or record) is identified by a combination of entities one from each dimension. FIG. 1 shows a star schema for a supermarket business where the star schema is the outcome of the dimension modeling process.

Each dimension is a table where each record contains a key (or a composite key) that uniquely identifies each entity and a list of attributes to qualify or describe the corresponding entity (or key). Each fact record in the fact table would contain a foreign key to allow it to join to each dimension and a list of measures which represents the transactional data. The dimension table is usually not further normalized because the size of a dimension is usually much smaller than that of the fact table; thus, the space saved by normalizing would not be that significant. Also, it is not time-effective for an OLAP query tool to join the normalized dimension tables at query run-time.

Theoretically, an OLAP tool could directly query against a data mart which contains transactional data in the above star schema layout. However, in order to allow fast response time on high level queries, for instance, a query to get the monthly sales volume of a particular brand product for each state, pre-aggregation of data in a data warehouse is required.

Levels of data are specified in each dimension for the purpose of aggregation. Each level defines a grouping of dimension entries based on a condition. For instance, in the store dimension of FIG. 1, a state level could be specified which would contain one aggregated dimension record for each state having at least one store. In other words, each aggregated dimension record for a particular state would represent the aggregation of data from all stores that are in that state. Similarly, we could specify a city level in the store dimension to allow the creation of aggregated dimension records where each entry represents the aggregation of all stores in a particular city.

A level referred to as the input (or detail) level is the lowest level and contains the same number of records as the input dimensional data. Levels specified by users for aggregation purpose are referred to as aggregate levels. Each aggregate level will contain a different number of records depending on the level condition. For instance, the state level will probably contain less records than the city level. Each (input and aggregated) level is uniquely identified by a level code. The level code is generally represented as an integer for efficiency.

The aggregation required in the output fact data is specified by a combination of levels, one from each dimension. The combination of levels used to specify aggregation is also referred as a cross product of levels. To do a month by brand by state query in the above star schema example, the corresponding level would need to be defined in each of the dimensions and it would need to be specified that aggregation is required of the transactional data based on the cross product of the three specified levels. Users may specify a list of cross products for which they desire aggregation. The cross product of input levels represent the input or detail fact data. There could be one or more aggregation expressions associated with each input fact measure to be aggregated. Some common aggregation expressions includes: max, min, average, sum, count, weighted average, and fill with constant value for aggregated data.

An "all values" level is normally also provided in each dimension which has a single member containing all dimension entries. This level is used in cross products when the corresponding dimension is not involved in the cross product, so that a single format for cross products can be defined each containing a level from every dimension. Adding an "all entries" level into a cross product has no effect on the result of the aggregation and acts as a dummy entry in the cross product. For example, if the star schema of FIG. 1 were being used, and a city by month cross product was required, the product "all entries" level would be incorporated in the cross product. Effectively, the data for all products is aggregated into a city by month aggregate record.

After the process of aggregation, a data mart is generated. Each data mart contains a set of dimension and fact tables. Each dimension in a data mart corresponds to one dimension in the source star schema. The fact table in a data mart contains aggregated data for a list of specified cross products.

A previous product provided by the present assignee is a consulting service which does recognition of containment relationships between detail dimension records and aggregated dimension records, aggregation of fact data, and distribution of the aggregated dimension and fact data.

The aforementioned product has a basic mechanism of output distribution. It can distribute different levels of detail and aggregated dimension records to different output dimension files/tables and distribute different aggregate level cross products to different output fact files/tables. However, it does not truly support the concept of populating multiple data marts.

Only one target (output) star schema configuration is allowed. It does not support the concept of having data marts that are of different star schema configurations. Thus, the different output dimension or fact tables generated are bound to the same output target star schema configuration.

Likewise, the aforementioned product doesn't allow the generation of different aggregates in different target fact tables. All fact tables have to have the same type of aggregates. However, aggregates that are of interest to one group of users may not be of interest to another group of users. Thus, allowing different aggregates can both save resources wasted on processing unnecessary data and limit the scope of data accessible by users.

Furthermore, dimension tables are not tied to any particular fact table. Although the product can generate multiple dimension and fact tables, the concept of a data mart is not enforced to ensure that the correct dimension tables are joined to the correct fact table. In addition, users can specify a dimension table to contain levels that are not related to the cross products of its corresponding fact table. This could be very error prone on database systems that check for referential integrity between dimension and fact tables.

Many techniques exist today that do not have enough flexibility and efficiency to generate multiple data marts in a single aggregation generation process. The following are the reasons why such flexibility and capability is required:

1) It is often not desirable to generate a single data mart that has all the aggregates needed by all user groups because it would contain unnecessary data to other user groups. Moreover, the set of generated aggregates could be too large to be duplicated or shared among different user groups at different physical locations.
2) Small and specialized data marts contain smaller amounts of data and a less complex view of the data to the targeted user group. Querying against specialized data marts is also more efficient because of the smaller or scoped set of aggregated data.
3) Data marts are often required to have different target star schema configurations and aggregates because different user groups are interested in a different set of dimension attributes or fact aggregates. Moreover, different user groups often look at the data in different ways.
4) Data partitioning is very essential in saving storage resource. The ability to have different fact tables sharing the same dimension tables is commonly needed. An example is having two data marts: one for actual sales and one for predicted sales. Both data marts could share the same dimension tables; however, each data mart will need to have its own fact table containing its own view of the fact data.
5) Running aggregation generation multiple times to generate specialized data marts is too expensive. The overhead of doing aggregation multiple times is prohibitively high because it involves reading the input fact file and analyzing the input fact containment in different aggregation buckets multiple times.

Data marts contain published data used by OLAP tools for effective high-level queries. Aggregated data in data marts is mainly used for decision support for effective business management. However, different user groups may require different sets of aggregated data from the same set of transactional data. For instance, the west region marketing group may only care about data for the west region; thus, it would be effective to build different data marts for different geographic subsets from one set of national sales data. On the other hand, users may also require data that is of interest among all regions like the sum of nationwide sales figures. In this case, data marts may also contain some overlapped aggregated data.

SUMMARY OF THE INVENTION

In order to effectively resolve the above described needs, a methodology is provided to populate multiple data marts from one set of transactional data in a single aggregation process. In other words, this methodology partitions aggregated data from the same operational data source. It is much more resource effective to populate multiple data marts in one aggregation run than to have multiple runs, one for each data mart or partition. Multiple runs require reading the input fact data multiple times and generating similar (if not the same) aggregate buckets on each run. The needs and the benefits of multiple data mart population (or data partitioning) will be further described in the following sections.

The system involves three main processing steps: dimension processing, aggregation processing, and data mart distribution. As the invention relates primarily to multiple data mart population, the two earlier steps of the aggregation process are assumed to be finished before the execution of the described technique. The techniques for achieving dimension and aggregation processing are well-known and available. In one aspect of the invention, a technique is provided for the population of multiple data marts given user-specified data mart information, a list of fact aggregates, and one list of dimensional data for each dimension.

BRIEF DESCRIPTION OF THE DRAWINGS

A specific embodiment of the invention is hereinafter described with reference to the following drawing in which.

DETAILED DESCRIPTION OF THE INVENTION

Figure 1:
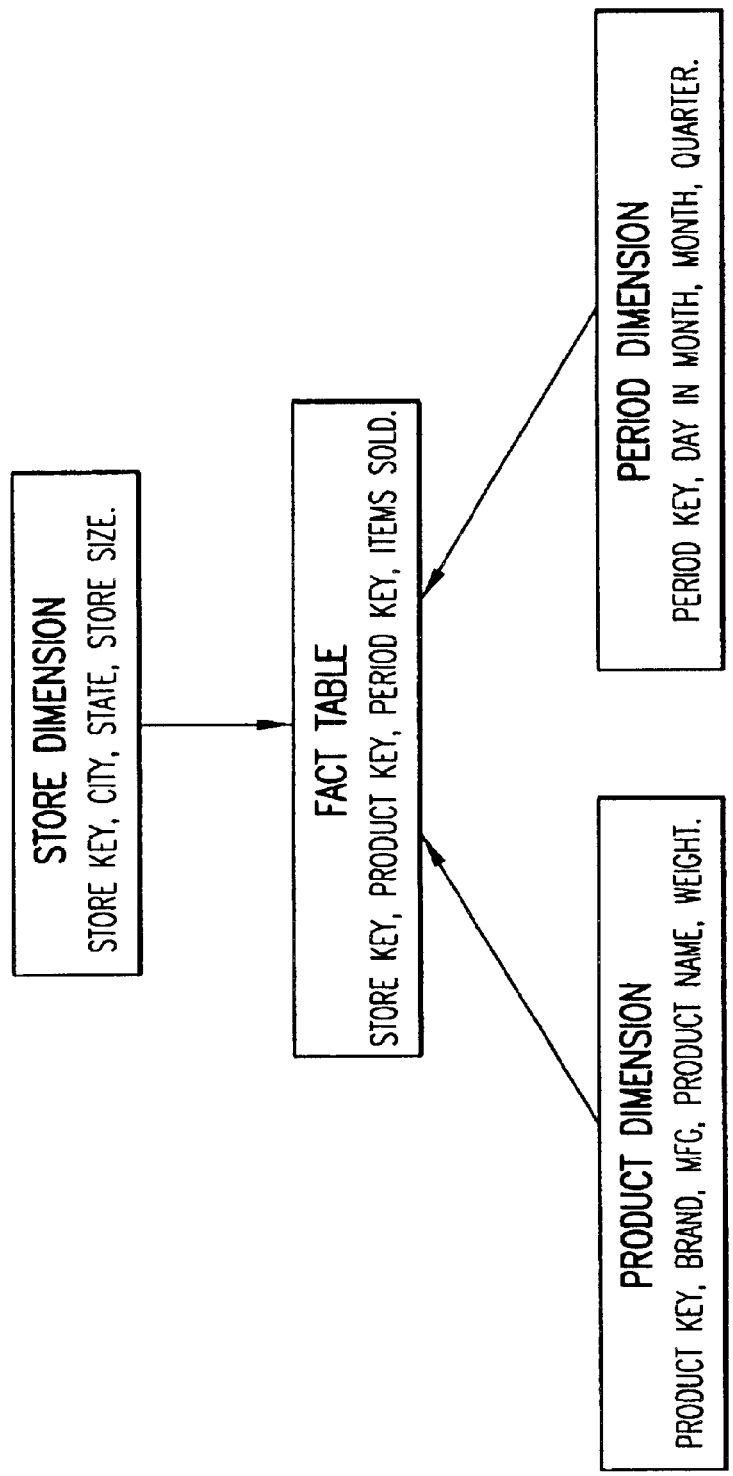
FIG. 1 shows an example star schema of a simple supermarket business.

A specific embodiment of the invention will hereinafter be described.

There follows a description of each component that is required as input to this process for a specific embodiment of the invention.

Users have to specify both dimension and data mart information for data mart population. This is called dimension definition and data mart definition respectively. Thus, users have to specify a list of dimension definitions (one for each dimension) and a list of data mart definitions (one for each data mart to be generated.)

In each dimension definition, users have to specify the following information. This does not include the information required for dimension and aggregation processing.

1. Dimension Name

A unique name to identify the dimension.

2. Level Conditions and Level Codes

List of aggregated levels that are available for aggregation. Each level is uniquely identified by a level code. The level condition determines the grouping of dimensional records within each level.

3. Dimension Output Filtering Flag (Optional)

The dimension output filtering flag controls the dimension records to be outputted in each data mart. One filtering option is specified for each dimension. This flag is not a requirement for the data mart population technique described. In other words, the technique could be implemented without using this flag; however, it is included as part of the described implementation because it has been found to be very useful in some scenarios. The following are the four output filtering options:

a) No output. No dimension records will be outputted in the dimension tables for all data marts. This is useful if users do not have new records in the input dimension table. For instance, in a supermarket schema, if there are no new products in the product dimension and users did not specify new levels for new aggregates to be generated, then there is no need to generate the dimension records because they should already exist in the database in previous aggregation generation.

b) All records. Any dimension record that has a level code that is in the output cross products of a particular data mart will be outputted to the dimension table of the data mart. For instance, in the supermarket schema, if the brand by month by state aggregates are to be outputted to a data mart and this output option is selected for the product dimension, then all brand records will be outputted to the product dimension table for the data mart. This would include brands that have not occurred in the current fact table.

c) Active in data marts. This is a subset of records from the 'All records' option. Dimension records must also be active in a data mart in order to be outputted to its dimension table. Like the example given in the previous option, a brand must also be active in the current aggregation process (input fact table) in order for the dimension record to be outputted to the dimension table.

d) Ever active in any data marts. This is a subset of records from the 'All records' option. Dimension records must also be active in the current or any previous aggregations of a data mart in order to be outputted to its dimension table. Like the example given in the 'All records' option, brand records that are active in the current or any previous aggregations will be outputted to the dimension table. For brands that have never participated in the output fact data for that data mart, they will not be outputted to the dimension table.

For each data mart definition, users have to specify the following information:

4. Data Mart Name

A unique name to identify the data mart.

5. Level Cross Product List

This is a list of all of the combinations of levels that should have aggregates computed in the current data mart. If the current data mart requires outputting input fact data, the list of level combinations would contain an entry of input level cross products. In the simplest case (one dimension), this is simply a list of the levels to create aggregates for. Each level cross product has one level code entry corresponds to each dimension. The order of level codes in the cross product should correspond to the order of the dimensions specified in the dimension definition list. (This is not a requirement, but makes things simpler if true.)

6. Dimension Table Definition List

The dimension table definition list contains one dimension table definition entry for each dimension. Each dimension table definition contains column information like column position, data types, default values, and other database related information. Moreover, for each column, the user also needs to identify whether it is a key column or attribute column. For attribute columns, each column corresponds to an input attribute column.

Instead of specifying a new table definition for a dimension, users may specify a dimension table definition to be the same as another table definition for the same dimension in another data mart. In this case, the two data marts will share the same target dimension table. Output records for the dimension from both of the data marts will be merged into the same target dimension table. Indeed, one or more data marts could output their dimensional data to the same target table.

7. Fact Table Definition (Including List of Measures to be Generated)

Each data mart definition will contain one fact table definition. A fact table definition contains column information like column position, data types, default values, and other database related information. Moreover, the user also needs to identify which are the key columns and which are the measure columns.

There should be one key column to correspond to each dimension. The data type of the key column must be coherent with the data type of the key column specified in the dimension table definition.

Each measure column should correspond to a measure definition. Each measure definition specifies an aggregation type and some measure column(s) from the input fact table depending on the aggregation type. In the presently preferred implementation, these aggregation types are supported: maximum, minimum, sum, average, weighted average (which involves the column to be averaged and a "weight" column), count, and fill (places a given value into the aggregate). Other types of aggregation could easily be incorporated into the implementation.

Instead of specifying a new fact table definition for the current data mart, users may specify a fact table definition from another data mart. In this case, the two data marts will share the same target fact table. Output aggregate records from both of the data marts will be merged into the same target fact table. Indeed, one or more data marts could output their fact data to the same target table.

A list of fact aggregates is the output of the aggregation generation process. It contains fact data in both input and aggregated levels. The list of fact aggregates serves as one of the inputs to the data mart distribution algorithm of the invention. Each fact aggregate record contains a key to join to each dimension, a cross product level code combination, and a list of aggregated measures. The record has the following logical representation:

| $Key_1$ | ... | $Key_N$ | $Level_1$ | ... | $Level_N$ | $Measure_1$ | ... | $Measure_M$ |
|---|---|---|---|---|---|---|---|---|

There should be one foreign key for each dimension. The foreign keys are best represented as integral numbers (as they are in the presently preferred implementation) because they are faster to compare, but other data types could be chosen. The keys in the record are ideally listed in the same order as the dimension definition list in the data mart structure. However, this is not a requirement. They could be remapped into the desired order as will be described later.

The level code combination represents the cross product level combination that the current aggregate record corresponds to. Each level code represents an aggregation or detail level from each dimension. It would be simpler if the level codes are in the same order as the dimension definition list specified in the data mart structure. However, this is not a requirement. Based on the level code combination, a determination is made of whether an aggregate record needs to be written to a particular data mart. The level code combination may also contain detail level codes from all dimensions. In this case, the record is a detail level fact record and the measures may contain the same values as the input fact record depending on the aggregation types. Some data marts may require detail level aggregates to be written out.

Measures are the aggregates generated for the record. The list of measures must be a superset of all measures required by all data marts. The measures could be listed in any order. As will be described in a later section, the order of the measures could be remapped to the desired order for data mart population.

Since the fields in the fact aggregate record are not listed in any pre-assumed order, users also need to define a fact aggregate record definition. The definition would contain a list of fact record field definitions. Each field definition contains an enumeration to indicate whether the field is a key, level code, or measure. If the field is a key or level code, its field definition would contain a reference to the dimension definition. If the field is a measure, its field definition would contain a measure definition. The fact record definition allows the distribution process to know what each field is referring to and remap each field accordingly.

There is one list of dimension records for each dimension. It contains both input level and aggregated level dimensional records. Each dimension record contains: a key, a level code, a list of attributes, and an optional ever active switch. The list of dimension records also serves as an input to the data mart distribution algorithm of the invention. The following table shows the logical picture of a dimension record:

| Key | Level code | Attributes$_1$ | ... | Attributes$_a$ | Ever active switch |
|---|---|---|---|---|---|

The key field contains the key of the current dimension record. It is an integral value in the presently preferred implementation for fast comparison.

Level code is a unique level identifier that indicates the (detail or aggregated) level of the current record. Level code is an integer in the presently preferred implementation for fast comparison.

Attribute$_1$ to Attribute$_a$ represent the attribute values of a record. For detail records, they contain the same values as the input dimension records. For aggregate records, some attributes may contain empty values because they are the attributes over which the record is aggregated.

For instance, a brand level dimension record may not have the product name attribute filled in because each brand record is an aggregation over many individual product names.

The optional ever active switch is a boolean value which indicates whether the current record has ever been active in any data mart or in any previous aggregation generation process. The switch is used together with the optional dimension output filtering flag to filter dimensional output. As mentioned before, the output filtering capability is not required for the multiple data mart population technique, but it is found useful to be part of the population process by some users. If the ever active switch is not used, the list of dimensional records will not need to be persistent. If the ever active switch is used, then the dimension record together with the switch will need to be persistent so that the "ever active in data marts" output filtering option could function properly. In the presently preferred implementation, a master database is provided for each dimension to maintain the dimension records ever seen. This flag is maintained as a book-keeping activity during data mart population. Further description is provided later in this description.

Since the fields in the dimension record are not listed in any pre-assumed order, users also need to create a dimension record definition. The definition contains a list of dimension record field definitions. The field definition contains an enumeration to indicate whether the field is a key, attribute, or ever-active switch. If the field is an attribute value, its field definition would contain a reference to its input dimension column. No additional information is required for a key field or the ever-active switch. The dimension record definition allows the distribution process to know what each field is referring to and remap each field accordingly.

Figure 2:
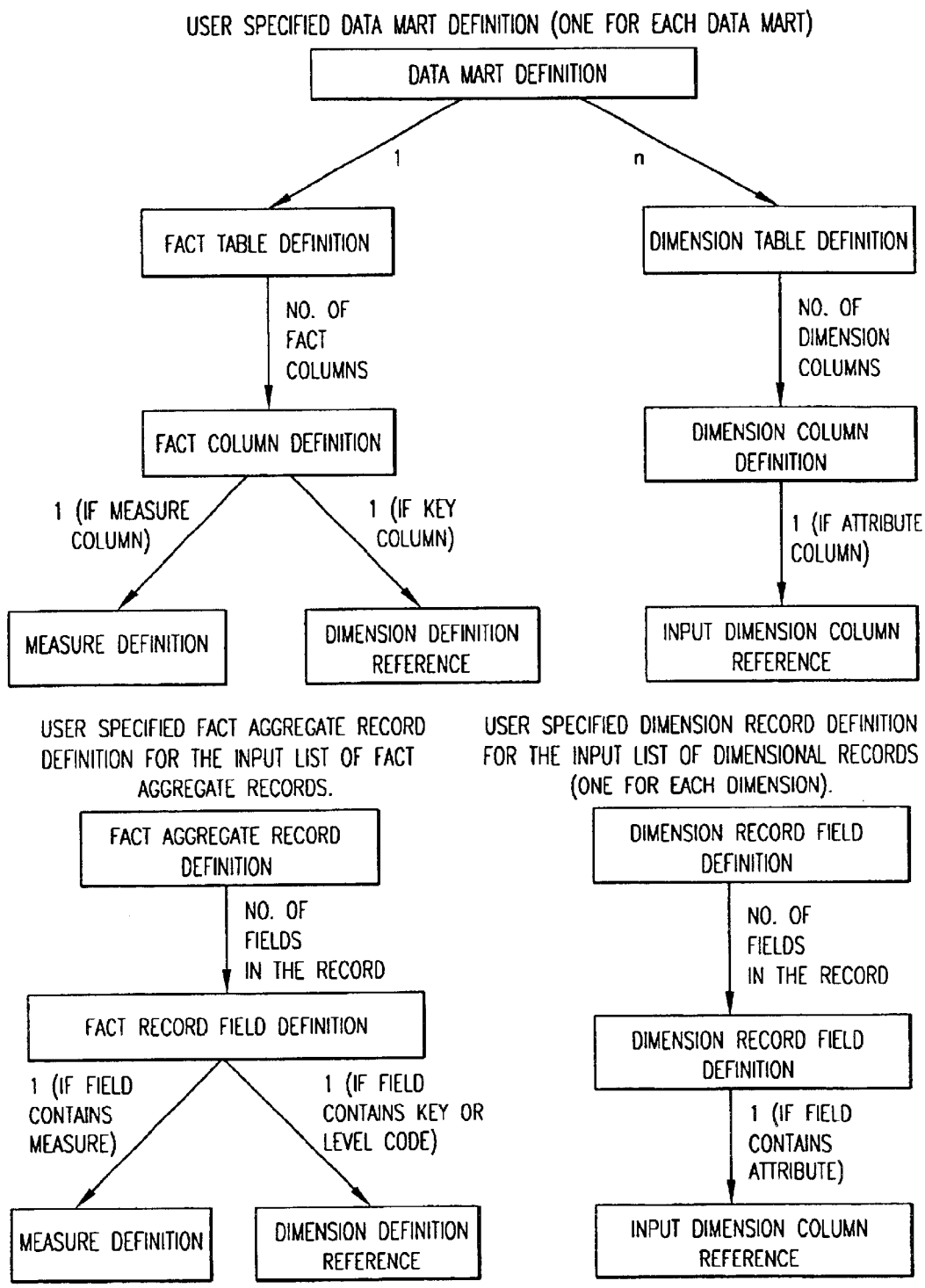
FIG. 2 shows definition containment relationships wherein arrow lines indicate a containment relationship and the value next to each arrow line indicates the number of instances.

FIG. 2 shows the containment relationship among different table or column definitions that have been mentioned above.

The data mart population technique of the invention is very different from previous population techniques in that it closely ties the dimension tables with the fact table in each data mart. In a single aggregation generation process, it allows multiple data marts to be populated. Each data mart can represent a different star schema, contain different dimension attributes and different aggregates. Furthermore, data partitioning is allowed so that data marts may share the same dimension or same fact tables. Thus, dimension or fact tables generated from more than one data mart will contain merged data from those data marts.

The system of the specific embodiment of the invention described involves the following components: a data mart structure, a fact writer, and dimension writers (one writer per dimension). The following subsections describe the design and major operations of each the three main system components.

Figure 3:
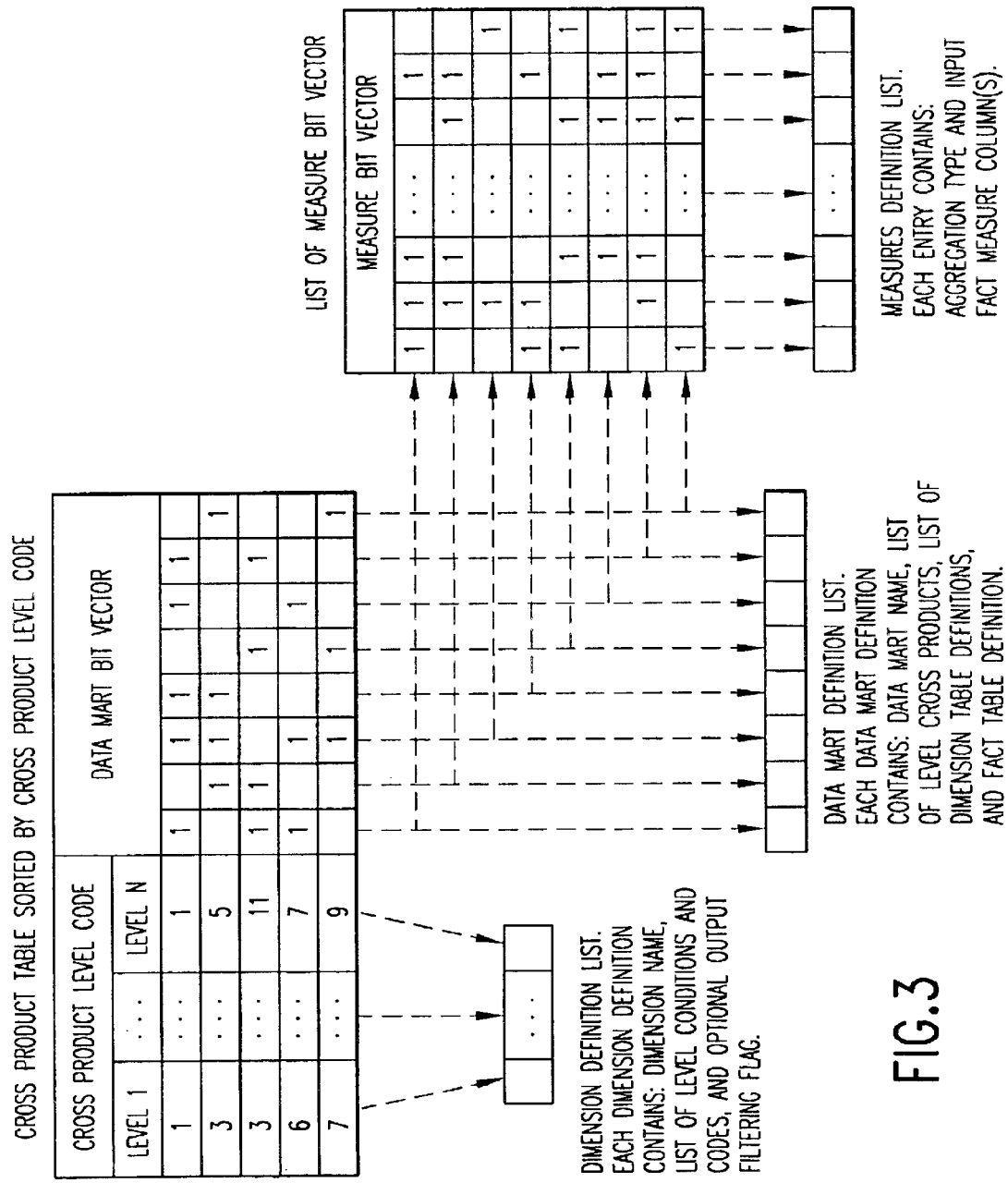
FIG. 3 shows a data mart structure, wherein dotted arrow lines indicate how dimensions, data marts and measures are indexed in the data structure.

Based on the above user-specified information, the information could be analyzed and structured internally as depicted in FIG. 3. This is referred to as the data mart structure. The structure mainly provides access methods for other system components to get the data mart attributes specified by users.

The above data mart structure is constructed by analyzing the user specified information. The cross product table in the data mart structure contains a list of cross product level code and data mart bit vector pairs. The level codes in each cross product are listed in the same order as specified by the dimension definition list. The bits of the data mart bit vector are listed in the same order as specified by the data mart definition list.

The cross product table contains a distinct set of cross product level codes required by all data marts. It is obtained by merging the cross product level codes specified in each data mart. The table is sorted by the level code combination to speed up searching. Level codes are integer values in the presently preferred implementation for fast comparison. Associated with each level code combination is a bit vector which indicates the data marts in which the cross product is participating. The values in the cross product table are constructed by parsing the list of level cross products in each data mart, adding each new level cross product entry to the table, and setting the current data mart bit to 1 in the new or found entry.

The measure definition list and list of measure bit vectors are generated by further analyzing the data mart definitions.

The measure definition list contains the distinct set of measure definitions that are required by all data marts. The vector is obtained by finding the unique measures required by each fact table of each data mart. Each measure definition is uniquely identified by its aggregated input measure column(s) and its aggregation type (e.g., SUM, MAX, MIN, etc.). The list of measure bit vectors contains one entry per data mart. Each measure bit vector indicates the measures that are required for its corresponding data mart. The two lists are initialized by looping through each measure definition of the fact table from each data mart. The major steps required are indicated in the following pseudo-code:

```
// martDefList, measureDefList, and measureBitVectorList
// are the data mart definition list, measure definition
// list, and list of measure bit vectors respectively that
// are maintained in the data mart structure.
InitializeMeasuresInfo () {
  // initialize the list
  measureDefList.clear ();
  // first find the unique set of measure definitions
  for (i = 0; i < martDefList.size (); i++) {
    vColumns =
       martDefList[i].factTableDef.GetColumns ();
    // loop through each column in target table
    for (j = 0; j < vColumns.size (); j ++) {
      if (vColumns[j].IsMeasure ()) {
        // check if the measure def is already in the
        // current measure definition list.
        foundIndex = findMeasureDef (measureDefList,
             vColumns[j].GetMeasureDef ());
        // if new measure
        if (foundIndex == -1)
          measureDefList.AppendEntry
             (vColumns[j].GetMeasureDef ());
      }
    }
  }
  // add measure bit vector to the list; one per data mart
  for (i = 0; i < martDefList.size (); i++) {
    vColumns =
       martDefList[i].factTableDef.GetColumns ();
    // initialize measure bit vector
    bitVector = 0;
    // loop through each column in target table
    for (j = 0; j < vColumns.size (); j ++) {
      if (vColumns[j].IsMeasure ()) {
        // find the measure definition from the list;
        // the measure definition should be found
        foundIndex = findMeasureDef (measureDefList,
             vColumns[j].GetMeasureDef ());
        measureBit = 1 << foundIndex;
        bitVector = bitVector | measureBit;
      }
    }
    // add the bit vector of required measures to the
    // list
    measureBitVectorList.AppendEntry (bitVector);
  }
}
```

Once the data mart structure is constructed, it is available for other system components to query user-specified parameters. The following list contains all the access methods required for the data distribution technique.
1) Get All Measure Definitions
   vMeasuresDef=GetMeasureDefinitions ( ) const
   Get a constant reference to the measure definition list. The vector contains all distinct measures required by all data marts. Each measure definition contains information of the aggregation type and its input measure column(s).
   numMeasures=GetNumMeasures ( ) conts
   Get the total no. of measures in the data mart structure. It is the same as the size of the measure definition list.

2) Get Measure Definition Index
   index=GetMeasureIndex (const measureDefinition& def) const
   Find the specified measure definition in the measure definition list of the data mart structure. It returns a 0-based index of the measure found in the list. If the specified measure definition is not found, the method returns −1.
3) Get All Dimension Definitions
   vDimensionsDef=GetDimensionsDefinitions ( ) const
   Get a constant reference to the dimension definition list. The vector contains all dimension definitions. Each dimension definition contains the dimension output filtering flag and level codes and conditions.
   numDimensions=GetNumDimensions ( ) const
   Get the total no. of dimensions in the data mart structure. It is the same as the size of the dimension definition list.
3) Get Dimension Definition Index
   index=GetDimensionIndex (const dimensionDef& def) const
   Find the specified dimension definition in the dimension definition list of the data mart structure. It returns a 0-based index of the dimension found in the list. If the specified dimension definition is not found, the method returns −1.
4) Get All Data Mart Definitions
   vDataMartsDef=GetDataMartDefinitions ( ) const
   Get a constant reference to the data mart definition list. The vector contains the definition of all data marts. Each data mart definition contains the dimension and fact table definitions as described in section 1.1.4
5) Get Active Data Marts for a Cross Product
   vMartBits=GetActiveMarts (const crossProductLevelCode& xprod) const
   Given a cross product level combination, it determines which data marts will need to generate the specified cross product in its fact output. It basically searches the cross product table and finds the specified cross product. The returning bit vector is indexed the same way as the data mart definition list. A bit set to 1 indicates the corresponding data mart needs to generate/output the specified cross product.
6) Get Active Measures for a Data Mart
   vMeasBits=GetActiveMeasures (const dataMartDefinition& rMart) const
   vMeasBits=GetActiveMeasures (int iMart) const
   Given a data mart definition or a data mart index, it obtains the measure bit vector for the specified data mart. The returning bit vector is indexed the same way as the measure definition list. A bit set to 1 indicates the corresponding measure is required for the data mart.
7) Get Active Data Marts for a Level Code
   vMartBits=GetActiveMarts (const dimensionDefinition& rDim, const levelCode& code )const
   vMartBits=GetActiveMarts (int iDim, const levelCode& code )const
   Get the data marts that need to output dimensional records of the specified level in the specified dimension. This function basically loops through the cross product table and matches the specified level code of the specified dimension in each cross product combination. It then bitwise ORs the data mart bit vector from each found entry. The returned bit vector is indexed the same way as the data mart definition list. A bit set to 1 indicates the corresponding data mart needs to generate/output,the input level cross product.
8) Get Active Level Codes Given a Dimension and a Data Mart
   vLevelCodes=GetActiveLevels (const dimensionDefintion& rDim, const dataMartDefintion& rMart) const
   vLevelCodes=GetActiveLevels (int iDim, int iMart) const Given a dimension and a data mart definition or their corresponding indexes, these methods obtain a list of distinct level codes from the specified dimension where the levels are in the list of cross products of the specified data mart. For a particular data mart, whether a dimension record is outputted to a target table depends on whether its level has participated in any cross product combinations of its fact table and the value of the dimension output filtering flag.

The "Fact writer" is a functional component responsible for generating the fact tables for all data marts. It takes the list of fact aggregates and its record definition as input, queries the data mart structure for other user-specified parameters, and outputs a fact table for each data mart. Note that a fact table may correspond to more than one data mart if multiple data marts have specified to merge its records to the same fact table.

As mentioned previously, each fact aggregate record contains a list of keys, level codes, and measures. However, the keys, level codes, and measures are not required to be in the same order as the dimension definition list and measure definition list in the data mart structure. Their orders are specified in the fact aggregate record definition. Thus, the "fact writer" will need to setup a mapping scheme to re-position the columns from the aggregates record based on the dimension and measure order in the data mart structure.

Internally, the fact writer will need to setup a key position vector, a level code position vector, and a measure position vector. The size of the key and level code position vector is the same as the number of dimensions. The size of the measure position vector is the same as the size of the measure definition list in the data mart structure. These vectors basically contain the column positions of the keys, level codes, and measures from the fact aggregate records. They are used for re-mapping the columns so that the fact writer could process the aggregate records in the same dimension or measure order as specified in the data mart structure. The following pseudo-code depicts the major steps of how the different position vectors are set up. The input to the function described therein is the data mart structure.

```
// After execution of the function, the keyPosVect,
// xProdPosVect, and measurePosVect vectors are setup for
// remapping columns from fact aggregate records. Each item
// in the vectors will contain the corresponding column
// position from the fact aggregate record.
ConstructRemappingVectors ()
{
  // initialize size of position vectors.
  keyPosVect.resize
        (dataMartStructure.GetNumDimensions ());
  xProdPosVect.resize
        (dataMartStructure.GetNumDimensions ());
  measurePosVect.resize
        (dataMartStructure.GetNumMeasures ());
  // loop through each field definition of the fact
  // aggregate record
  for (i = 0; i < factAggrRecordDef.size (); i++) {
    if (factAggrRecordDef[i].IsKey ()) {
      dimDef =
        factAggrRecordDef[i].GetDimensionDef ();
      // find the index of dimension definition from
      // the dimension definition list
      foundIndex =
        dataMartStructure.GetDimensionIndex (dimDef);
      keyPosVect[foundIndex] = i;
    }
    else
    if (factAggrRecordDef[i].IsLevelCode ()) {
      dimDef =
        factAggrRecordDef[i].GetDimensionDef ();
      // find the index of dimension definition from
      // the dimension definition list
      foundIndex =
        dataMartStructure.GetDimensionIndex (dimDef);
      xProdPosVect[foundIndex] = i;
    }
    else { // measure columns
      measureDef =
        factAggrRecordDef[i].GetMeasureDef ();
      // find the index of measure definition from the
      // measure definition list in data mart structure
      foundIndex =
        dataMartStructure.GetMeasureIndex
              (measureDef);
      // ignore measure that is not active in any data
      // marts
      if (foundIndex != -1)
        measurePosVect[foundIndex] = i;
    }
  }
}
```

The "fact writer" also needs to analyze the fact table definition specified in each data mart definition. It needs to maintain a list of distinct target table definitions required by all data marts. Associated with each target table definition is a data mart bit vector, a boolean vector, and a position vector for re-positioning the keys and measures to the position desirable by the target table. The information needed for each distinct fact target table is listed in the structure represented in the following pseudo-code:

```
factTableInfo {
    factTableDef;         // fact target table definition
                          // from data mart structure.
    dataMartBitVector;    // list of data marts merged
                          // into this target table.
    isKeyVector;          // boolean vector to indicate
                          // key or measure.
    positionVector;       // integer vector to indicate
                          // mapping position.
};
```

The following pseudo-code indicates how to construct the above described information:

```
// A fact table information list will be initialized with
// distinct target table information.
InitializeFactTablesInfo ()
{
  // clear the list of target table info stored in fact
  // writer
  factTableInfoList.clear ();
  // obtain data mart info from data mart structure.
  martDefList =
    dataMartStructure.GetDataMartDefinitions ();
  // for each data mart
  for (i = 0; i < martDefList.size (); i ++) {
    // check if fact table of current data mart has
    // already appeared in the factTableInfoList
    foundIndex = findTableDefintion
            (martDefList[i].factTableDef,
             factTableInfoList);
    martBit = 1 << i;
    if (foundIndex >= 0) { // if found
      // mark the current data mart also active in the
      // same target table.
      factTableInfoList[foundIndex].dataMartBitVector =
```

```
        factTableInfoList[foundIndex].dataMartBitVector |
            martBit;
    }
    else {
        // construct a new target table entry
        factTableInfo.factTableDef =
martDefList[i].factTableDef;
        factTableInfo.dataMartBitVector = martBit;
        // get the list of column definitions from
        // the table
        vColumns =
            martDefList[i].factTableDef.GetColumnDefs ();
        // set the size of key vector to no. of columns
        factTableInfo.isKeyVector.resize
                (vColumns.size ());
        factTableInfo.positionVector.resize
                (vColumns.size ());
        // loop through each column in target table
        for (j = 0; j < vColumns.size (); j ++) {
            if (vColumns[j].IsKey ()) {
                factTableInfo.isKeyVector[j] = true;
                // find index of dimDef in data mart
                // structure
                dimIndex =
                    dataMartStructure.GetDimensionIndex
                    (vColumns[j].dimensionDef);
                factTableInfo.positionVector[j] =
                    dimIndex;
            }
            else { // if column is a measure
                factTableInfo.isKeyVector[j] = false;
                // find index of vColumns[j].measureDef
                // in the data mart structure
                measureIndex =
                    dataMartStructure.GetMeasureIndex
                    (vColumns[j].measureDef);
                factTableInfo.positionVector[j] =
                    measureIndex;
            }
        }
        factTableInfoList.AppendEntry (factTableInfo);
    } // else
} // for
}
```

This pseudo-code populates a list of distinct fact target table information inside the fact writer based on the information from the data mart structure. It loops through each data mart and inspects its fact target table definition. First, it finds if the target table definition is already in the current target table list. If found, that means another data mart is already outputting its results to the same fact target table. Thus, the bit of the current data mart will be set into the data mart bit vector of the found target table information entry. If the data mart is outputting to a new fact target table, a new target table information entry will be added to the list. The bit of the current data mart will be set in the empty data mart bit vector. Also, a boolean and a position vectors will be populated for re-positioning target column purposes.

Figure 4:
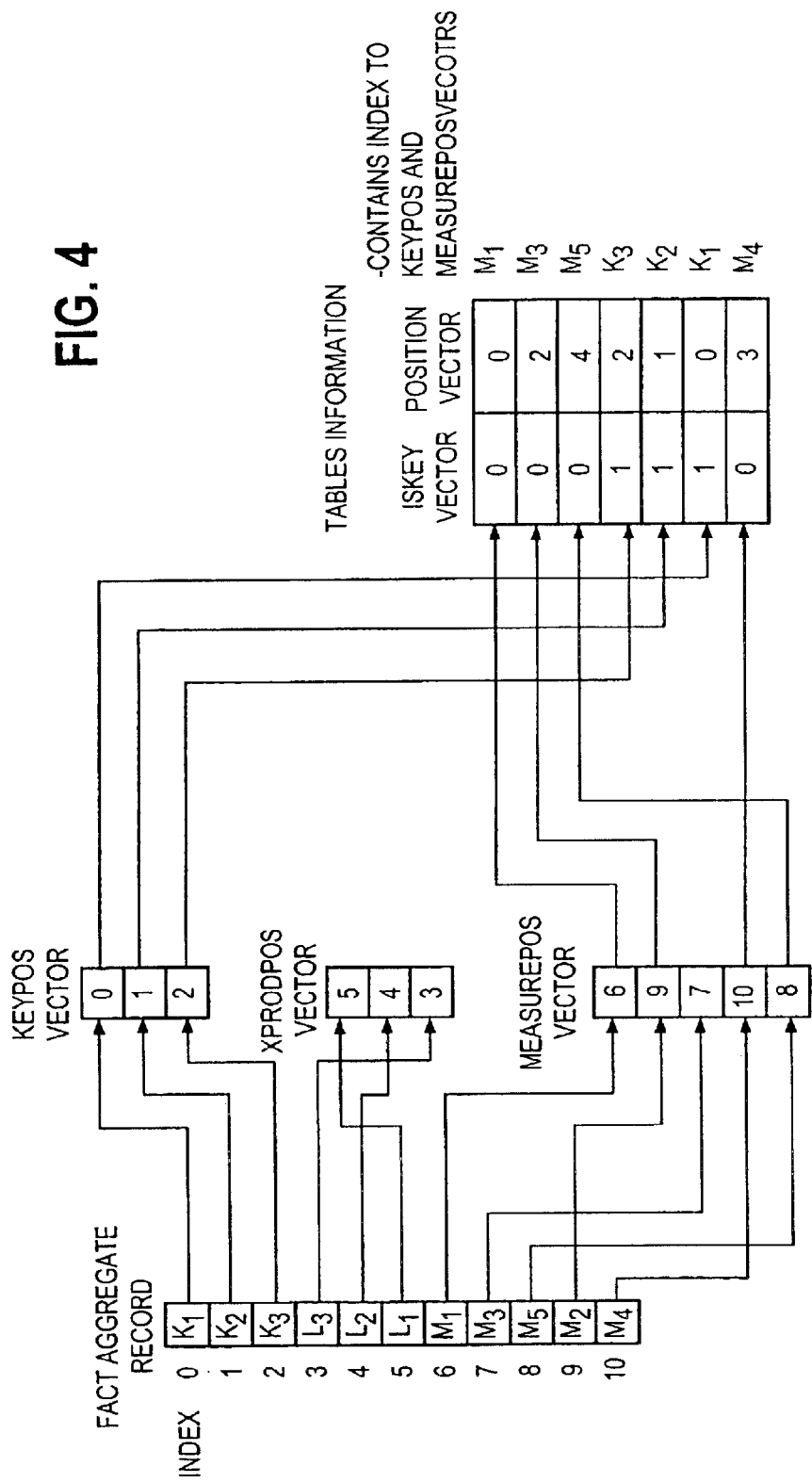
FIG. 4 shows an example of fact aggregate record mapping to the output target fact table. This example shows three dimensions and five measures mapping to one target fact table only.

The size of the boolean and position vectors are the same as the no. of columns in the target table. Each entry in the boolean vector indicates whether the output column is a key or a measure. If the column is a key, the corresponding value in the position vector would indicate the dimension index of where the key is from. If the column is a measure, the corresponding value in the position vector would indicate the measure index from the measure definition list in the data mart structure. These indexes are used to re-position the columns when the "fact writer" is given a list of keys and measures in the same order as the dimension and measure definition lists respectively. FIG. 4 describes an example of how the overall mapping mechanism works.

After the internal data structure of the fact writer is initialized, the "fact writer" can start reading the list of fact aggregates and distribute the aggregates to different target fact tables.

The "fact writer" will only need to read the list of aggregates once. For each record, it would re-map and distribute the mapped record(s) to each participating target table. The following pseudo-code function describes the process of multiple target table distribution given one aggregate record:

```
WriteAggregateRecord (aggrRecord)
{
    // fill up pre-allocated (or data members) keys, xprod,
    // and measures lists based on re-mapping columns from
    // aggrRecord.
    for (i = 0; i < dataMartStructure.GetNumDimensions ();
            i ++) {
        keys[i] = aggrRecord[keyPosVect[i]];
        xProd[i] = aggrRecord[xProdPosVect[i]];
    }
    for (i = 0; i < dataMartStructure.GetNumMeasures ();
            i ++)
        measures [i] = aggrRecord[measurePosVect[i]];
    // get active data marts for the current cross product
    activeMarts = dataMartStructure.GetActiveMarts (xProd);
    // loop through each distinct target table
    for (i = 0; i < factTableInfoList.size (); i++) {
        // if the record is active in the current
        // target table
        if (activeMarts &
            factTableInfoList[i].dataMartBitVector) {
            // loop through each column
            for (j = 0; j <
                factTableInfoList[i].isKeyVector.size ();
                j ++) {
                position =
                    factTableInfoList[i].positionVector[j];
                // re-position key and measure columns in the
                // pre-allocated outputRecord
                if (factTableInfoList[i].isKeyVector[j] ==
                    true)
                    outputRecord[j] = keys[position];
                else
                    outputRecord[j] = measures[position];
            }
            // output record to the target table
            writeRecordToTable (outputRecord);
        }
    }
}
```

There should be an outer loop to read each aggregate record and call this function to write the record to each participating target table. Thus, the above function is executed as many times as the number of records in the input list of aggregate records.

The function first re-positions the input aggregate records into three lists: key, cross product, and measure list. The mapped key and cross product lists should have the same order as the dimension definition list in the data mart structure. The mapped measure list should have the same order as the measure definition list. Then, the function determines the active data marts for the cross product of the current aggregate record. For each target table that participates in at least one of the active data marts, the key and measure list will be re-mapped to the desirable column position of the target table.

Note that the first step of re-positioning the columns from the input aggregate records is unnecessary if the record is pre-ordered as expected by the data mart structure. This is achievable by utilizing the data mart structure during aggregation generation as explained at the end of this document.

Since it is not a requirement for the data mart population technique, a more generic approach has been adopted and this assumption is not put as a pre-condition.

"Dimension writer" is a functional component responsible for generating dimension target tables of one dimension for all data marts. It takes a list of dimensional records as input, queries the data mart structure for user-specified parameters, and outputs a dimension table for each data mart. Note that a dimension table may correspond to more than one data mart if multiple data marts have specified to merge its records to the same dimension table.

The "dimension writer" needs to set up some internal information before it can start data distribution. First, it needs to find the key, level code, and ever-active switch position based on its input dimension record definition. This could be performed by looping through each field in the dimension record definition as depicted in the pseudo-code shown below. It saves the found key, level code, and active switch position into an internal variable of the dimension writer:

```
// dimKeyPos - key position from input dimension record.
// dimCodePos - level code position from input dimension
// record.
// dimSwitchPos - active switch position from input
// dimension record.
GetDimPositions ()
{
  dimKeyPos = -1;
  dimCodePos = -1;
  dimSwitchPos = -1;
  for (int i = 0 ; i < dimRecordDef.size (); i++) {
    if (dimRecordDef[i].IsKey ())
      dimKeyPos = i;
    else if (dimRecordDef[i].IsLevelCode ())
      dimCodePos = i;
    else if (dimRecordDef[i].IsActiveSwitch ())
      dimSwitchPos = i;
  }
}
```

Before doing multiple dimension tables distribution, a pre-processing step is required to obtain an active data mart bit vector for each dimensional record. The bit vector is used to aid the output filtering option described with respect to the input requirements. Thus, if output filtering is not implemented, this pre-processing step could also be eliminated. The output of the pre-processing step is a list of data mart bit vectors for each dimension where each data mart bit vector corresponds to one dimensional record.

The pre-processing step could populate the lists of data mart bit vectors for all dimensions at the same time by reading the list of fact aggregate records once. Initially, the lists of data mart bit vectors of all dimensions are set to 0. Then, for each fact aggregate record, the key and level code pair are found for each dimension. The data mart bit vector associated with the cross products of the levels for each dimension are found using the "Get active marts for a cross product" method. For each key, the dimensional record is found from the corresponding dimensional record list by matching the key. Finally, the data mart bit vector of the found dimensional record will be ORed with the data mart bit vector just obtained from the data mart structure. The found dimensional record is accordingly considered active in the data marts specified in the data mart bit vector as well as any data marts it was already associated with due to appearing in other cross products.

Thus, by reading the list of fact aggregates once, the data mart bit vectors of all dimensions will be populated. The pre-processing step can be optimized to be performed during aggregation generation. However, since the initialization of the data mart bit vector list is part of the preferred data mart population technique, the pre-processing step is divided out to provide a more general approach.

The "dimension writer" also needs to query the data mart structure and analyze the dimension table definition information for the current dimension specified in each data mart. Internally, the dimension writer needs to maintain a list of distinct dimension target table definitions required by all data marts. Associated with each dimension table definition is an active data mart bit vector, a list of active level codes, and a position vector for re-positioning the keys and attributes to the position desirable by the target table. The information needed for each dimension target table is listed in the following structure:.

```
dimTableInfo {
  dimTableDef;          // dimension target table
                        // definition from data mart
                        // structure.
  dataMartBitVector;    // list of data marts merged
                        // into this target table.
  levelCodeVector       // contains list of active
                        // level codes for the table
  positionVector;       // integer vector to indicate
                        // mapping position.
};
```

The following pseudo-code indicates how to construct the above described information:

```
// A dimension table information list will be initialized
// with distinct target table information.
InitializeDimTablesInfo ()
{
  // clear the list of target table info stored in
  // dimension writer
  dimTableInfoList.clear ();
  martDefList =
    dataMartStructure.GetDataMartDefinitions ();
  // curDimDef is the current dimension definition
  curDimIndex =
    dataMartStructure.GetDimensionIndex (curDimDef);
  for (i = 0; i < martDefList.size (); i ++) {
    // check if dimension table of current data mart has
    // already appeared in the dimTableInfoList
    foundIndex = findTableDefintion
      (martDefList[i].dimTableDef[curDimIndex],
      dimTableInfoList);
    martBit = 1 << i;
    if (foundIndex >= 0) { // if found
      // add current data mart to data mart bit vector
      dimTableInfoList[foundIndex].dataMartBitVector =
      dimTableInfoList[foundIndex].dataMartBitVector |
        martBit;
      // merge current list of active level codes
      // into the found entry
      vCodes = GetActiveLevels (curDimIndex, i);
      mergeDistinctLevelCodes
      (dimTableInfoList[foundIndex].levelCodeVector,
      vCodes);
    }
    else {
      // construct a new target table entry
      dimTableInfo.dimTableDef =
        martDefList[i].dimTableDef[curDimIndex];
      dimTableInfo.dataMartBitVector = martBit;
      dimTableInfo.levelCodeVector =
        GetActiveLevels (curDimIndex, i);
      // get the list of columns from the table
      vColumns =
```

-continued

```
        martDefList[i].dimTableDef.GetColumnDefs ();
        for (j = 0; j < vColumns.size (); j++) {
            if (vColumns[j].IsKey ()) {
                // key position from input dimension
                // record
                dimTableInfo.positionVector[j] =
                    dimKeyPos;
            }
            else { // attribute column
                // key position from input dimension
                // record
                dimTableInfo.positionVector[j] =
                    dimRecordDef.FindInputColumn
                        (vColumns[j].GetInputColumn());
            }
        } // for
    }
} // for
}
```

This pseudo-code populates a list of distinct dimension target table information inside the writer based on the information from the data mart structure. It loops through each data mart and inspects its target table definition of the current dimension. First, it finds if the target table definition is already in the target table list. If found, that means another data mart is already outputting its results to the same dimension target table. Thus, the bit of the current data mart will be set into the data mart bit vector of the found table information entry. Also, the list of active level codes for the current data mart will be merged into the level code vector of the found entry. If the data mart is outputting to a new dimension target table, a new target table information entry will be added to the list. The bit of the current data mart will be set in the initial empty data mart bit vector. The level code vector entry will be populated with the list of active level codes for the current data mart. Finally, the position vector will contain indexes or column positions from the dimension record. The vector is used for re-positioning the columns from the dimension records to be outputted into the target table.

After the internal data structure of the dimension writer is initialized, it can start reading the list of dimensional records and distribute the records to different target tables.

The dimension writer will only need to read the list of dimensional records once. For each record, it would re-map and distribute the mapped record(s) to each participating target table. The following pseudo-code function describes the process of multiple target table distribution given one dimensional record and its corresponding active data mart bit vector.

```
WriteDimensionRecord (dimRecord, activeMartBitVector)
{
    for (i = 0; i < dimTableInfoList.size (); i++) {
        activeInTable =
            activeMartBitVector &
            dimTableInfoList[i].dataMartBitVector;
        levelInTable = findLevelCode
            (dimTableInfoList[i].activeLevelCodes,
             dimRecord[dimCodePos]);
        outputRecordFlag = false;
        // update the ever active switch
        if (activeInTable)
            dimRecord[dimSwitchPos] = true;
        // determine whether to output the record depending
        // on output filtering option
        if (filterOption == AllRecords) {
            if (levelInTable)
                outputRecordFlag = true;
        }
        else
        if (filterOption == ActiveInDataMarts) {
            if (levelInTable && activeInTable)
                outputRecordFlag = true;
        }
        else
        if (filterOption == EverActiveInDataMarts) {
            if (levelInTable &&
                dimRecord[dimSwitchPos] == true)
                outputRecordFlag = true;
        }
        if (outputRecordFlag == true) {
            for (j = 0; j <
                dimTableInfoList[i].positionVector.size ();
                j ++) {
                position =
                    dimTableInfoList[i].positionVector[j];
                outputRecord[j] = dimRecord[position];
            }
            writeOutputRecord (outputRecord);
        }
    } // for
}
```

The active data mart bit vector is the output of the pre-processing step. There should be an outer loop to read each dimensional record and call this function to write the record to each participating target table. Thus, this function is executed as many times as the no. of records in the input list of dimensional records.

The function loops through its list of dimension target table information. It first initializes two flags: activeInTable and levelInTable. activeInTable indicates whether the current dimension record is active in the fact. levelInTable indicates whether the level code of the current dimension record is in the level code list of the current target table. It then updates the persistent ever active switch. The switch is set to true if the activeInTable flag is true. Based on the filtering option, the logic determines whether the current dimension record should be outputted to the target table. If the record is to be outputted, the key and attribute columns will be re-mapped to the desirable column position of the target table.

It should be noted that the "Ever Active" flag associated with each input dimension record could be replaced with an "Ever Active in Data Marts" bit vector. This would allow dimension records to be output to target data marts if those data marts have ever received fact data corresponding to the data mart in question. However, this would require maintaining persistent data relating to the output data marts, preferably in the input dimension tables, between aggregations. This causes problems keeping the input fact data synchronized with the output data mart definitions and for this reason isn't implemented in the preferred embodiment described herein. The "Ever Active" flag implemented in the preferred embodiment doesn't contain any data dependent on the configuration of the output data marts.

Figure 5:
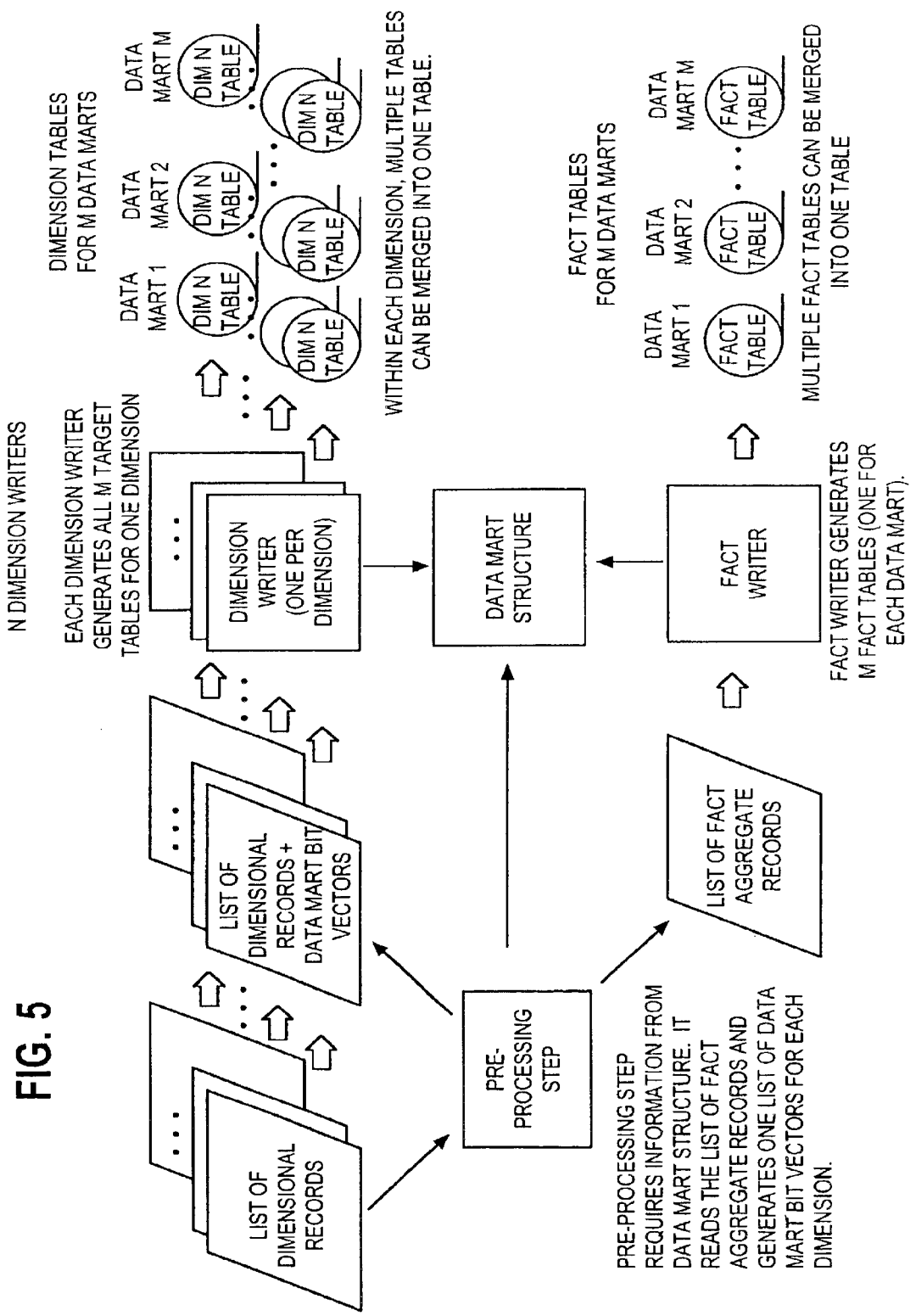
FIG. 5 shows the overall dataflow and operations of the multiple data mart population technique.

The operation of the system components and the flow therebetween are hereinafter described. FIG. 5 depicts an overview of data flow given the input requirements and the system components described in previous sections.

As depicted in the diagram, the data mart structure has to be constructed before distribution can start. Once the data mart structure is initialized, the pre-processing step for dimensional records can take place. The pre-processing step establishes the field positions of keys and level codes from all dimension record definitions and fact aggregate record definitions. After that, reading of the list of fact aggregate records is commenced. For each fact aggregate record, the data mart bit vectors of all the fact aggregate record's corresponding dimension records (one from each dimension) will be updated. Details of the pre-processing step were described earlier with reference to the "Dimension Writer".

When pre-processing is complete, the operations of the "fact writer" and the "dimension writers" can proceed in parallel. The "fact writer" takes the list of fact aggregate records as input, queries the data mart structure, and generates a fact table for each data mart. Each "dimension writer" takes a list of dimensional records and its corresponding list of data mart bit vectors generated from the pre-processing step as input, queries the data mart structure, and generates a dimension table for each data mart. Thus, the writers do not have any interdependency and they could perform their tasks independently. However, if the data marts are being loaded onto a database into tables in which referential integrity is enforced, at any particular instant, all key values in the fact data must have corresponding values in the dimension data. If the fact writer writes an entry before all its corresponding key values have been written by the dimension writer, there will be a breakdown in referential integrity. If the writers are being used in such an environment, referential integrity enforcement must be disabled before commencing the process and re-enabled when the process finishes. Alternatively, the fact writer could be set to commence only when the dimension writer has finished processing.

The following is a summary of the major benefits and advantages of the data mart population technique of the invention:

1) Allow population of multiple data marts in a single aggregation generation process.
2) Much more resource effective to generate multiple data marts in one shot since data marts can have overlapped aggregates requirements or even same levels of aggregations. It eliminates the overhead of reading input fact file and generating the same aggregation buckets multiple times.
3) Allow data marts to have different star schema configurations and different aggregates. The configuration of each data mart is tailored or targeted to the needs of different user groups.
4) Records in dimension table are closely tied to the aggregated records in the fact table. A record is in the dimension table only if the record level participates in the list of output cross products for the corresponding fact table. The data marts generated are much less error prone.
5) Allow data partitioning for large data sets. Logically separated data marts may merge and share dimension tables to avoid unnecessary duplication of dimensional data while having different fact tables. With the flexible scheme of data mart distribution, data could be partitioned or merged in different dimensions or fact tables.
6) Flexible dimension output filtering scheme allows users to choose the right set of dimension records to be outputted to dimension tables.

The technique provided in this document is intended to cover a more general scenario. Additional and reasonable assumptions could be applied to the technique for optimizations. This section describes a few variations of possible optimizations.

As mentioned before, the dimension output filtering flag is not a requirement for the data mart population technique of the invention. It is provided to enhance the capability of dimension records distribution. The logic has been provided to enable four output filtering options which are: no dimension output, all dimension records, active in data mart, and ever active in data marts. Additional output filtering option could be added based on other combinations of active data mart or level code criteria. The "ever active in data mart" output filtering capability requires dimension records ever seen to be kept persistent because each dimension record needs to maintain an "ever active" flag over time. If the "ever active in data mart" filtering capability is not needed to be supported, then dimension records are also not required to be persistent.

In the described technique, no assumptions were made about the measures in a fact aggregate record except that it should be a superset of all measures required. Also, no assumptions were made about the field position of the fact aggregate records and the dimensional records. In the preferred implementation, some reasonable assumptions were made because the data mart structure is constructed before aggregation generation. It is fairly common that users would have all the dimension and data mart definitions before aggregation generation.

Given the data mart structure before aggregation generation, the set of required measures is known. The order of dimensions and measures in the data mart structure is also known. In this case, only the required measures are generated during aggregation generation. The keys, level codes, and measures listed in each fact aggregate record could also be in some pre-assumed order. For instance, the first N fields in the record would be key fields in the same order of dimensions as specified in the data mart structure, the next N fields would be level code fields also in the same order of dimensions as specified in the data mart structure, the last M fields would be the measures in the same order as specified in the data mart structure. In this case, the initial re-positioning step from the fact aggregate record could be eliminated. For dimensional records, the key, level code and ever active switch could be assumed to be placed in the first three fields for optimization purposes.

If the data mart structure is constructed before aggregation generation, the pre-processing step for populating data mart bit vectors could also be eliminated. The task could be achieved during the same time as aggregation generation. Then there is no need to read the list of fact aggregates once just for the purpose of populating data mart bit vectors.

In the preferred implementation, when an input fact record gets aggregated into all its participating aggregation buckets, the data mart bit vectors of all dimensional records related to the input fact record and its aggregation buckets will be updated. The logic in updating the bit vectors is the same as described in the "Dimension Writer" section. However, in this case, it eliminates the need of reading the fact aggregate records one more time. Again, the data mart bit vectors in each dimension are used for output filtering purpose. If no output filtering is supported or the filtering options supported do not require the data mart bit vectors, then the step for populating the data mart bit vectors could be eliminated.

While the preferred embodiment of the invention has been shown and described, it will be apparent to those skilled in the art that changes and modifications may be made therein without departing from the spirit of the invention, the scope of which is defined by the appended claims.

What is claimed is:

1. A computer-readable data transmission medium containing control logic comprising:

a first portion generating aggregate fact data from a first data mart, the first data mart comprising input fact data and at least one dimension table, the aggregate fact data comprising at least one aggregate fact data record representative of the aggregate fact data summarized on at least one level other than an input fact data level;

a second portion distributing the aggregate fact data to a plurality of output data marts, whereby some non-identical aggregate fact data records are distributed to more than one output data mart;

a third portion providing at least one data structure specifying at least one level required by each output data mart;

a fourth portion establishing each aggregate fact data record required to be generated from the input fact data level;

a fifth portion generating each required aggregate fact data record;

a sixth portion establishing the at least one data structure indicating which output data marts require each generated required aggregate fact data record; and a seventh portion providing each output data mart with any generated required aggregate fact data records;

whereby a plurality of output data marts are generated from a first data mart.

2. The computer-readable data transmission medium of claim 1, wherein each aggregate fact data record is generated only once and then output to the output data marts requiring each aggregate fact data record.

3. The computer-readable data transmission medium of claim 1, wherein each data structure comprises a list of levels from at least one target dimension table in the first data mart, and wherein each level in the list of levels is associated with at least one output data mart, whereby the aggregate fact data record associated with an appropriate output data mart is based on the level.

4. The computer-readable data transmission medium of claim 3, wherein level codes are in an order similar to the list of levels associated with the at least one target dimension table.

5. The computer-readable data transmission medium of claim 1, wherein the fourth portion comprises:

an eighth portion compiling a list of the aggregate fact data and the at least one aggregate fact data record; and a ninth portion querying the at least one data structure for remaining parameters.

6. The computer-readable data transmission medium of claim 1, wherein the output data marts have at least one of a group consisting of:

different star schema configurations;

different aggregate data requirements;

overlapped aggregated data requirements; and same aggregate data requirements.

7. The computer-readable data transmission medium of claim 1, wherein the aggregate fact data records differ by at least one of a group consisting of:

a star schema configuration; and aggregate type.

8. The computer-readable data transmission medium of claim 1, wherein the dimension records are closely tied to the aggregate fact data records.

9. The computer-readable data transmission medium of claim 1, wherein each output data mart configuration is tailored to needs of each user group.

10. The computer-readable data transmission medium of claim 1, wherein the output data marts share at least one target dimension table.

11. The computer-readable data transmission medium of claim 1, wherein the user has a dimension definition and a data mart definition before the aggregated fact data is generated.

12. The computer-readable data transmission medium of claim 1, further comprising constructing the data mart structure before aggregation generation.

13. The computer-readable data transmission medium of claim 1, further comprising updating dimensional records related to an input fact record when the input fact record is aggregated into all its participating aggregation buckets.

14. A computer-readable data transmission medium containing control logic comprising:

a first portion generating aggregate fact data from a first data mart, the first data mart containing input fact data and an input dimension table, the aggregate fact data comprising at least one aggregate fact data record representative of the aggregate fact data summarized on at least one level other than an input fact data level;

a second portion distributing the aggregate fact data to a plurality of output data marts, whereby some non-identical aggregate fact data records are distributed to more than one output data mart; and a third portion generating at least one target dimension table for each output data mart from the at least one input dimension table, wherein each generated target dimension table contains only dimension records associated with levels requested by each associated output data mart.

15. The computer-readable data transmission medium of claim 14, wherein the aggregate fact data is shared by different output data marts.

16. The computer-readable data transmission medium of claim 14, wherein at least one generated target dimension table is shared by at least two output data marts.

17. The computer-readable data transmission medium of claim 14, wherein the third portion comprises:

a fourth portion generating a list of levels associated with the at least one target dimension table; and a fifth portion outputting at least one dimension record into a target dimension table only if a level associated with the dimension record is in a list of levels associated with the target dimension table.

18. The computer-readable data transmission medium of claim 17, wherein the list of levels associated with a particular target dimension table is generated by merging lists of levels in an appropriate dimension associated with each output data mart to which the target dimension table corresponds, and wherein each list of levels associated with a particular output data mart comprises a set of levels in a corresponding dimension of all cross products with which each output data mart is associated.

19. The computer-readable data transmission medium of claim 18, wherein generated target dimension tables in each output data mart contain only dimension records from the at least one input dimension table which appears in aggregated output fact data output to that data mart.

20. The computer-readable data transmission medium of claim 19, wherein the third portion comprises:

a sixth portion providing storing means for associating dimension records with each output data mart, and initially associating each dimension record with no output data marts;

a seventh portion comprising the following for each fact data entry, wherein each fact data entry includes a set of dimension entries corresponding to a specific dimension record in each dimension:
- an eighth portion establishing the level associated with each dimension entry in each dimension;
- a ninth portion establishing the data marts associated with the fact data entry based on a cross product of the levels, and for each dimension, associating each data mart with a dimension record corresponding to a dimension entry if the data mart is not already associated with the dimension entry;
- a tenth portion outputting each dimension record to each target dimension table if the dimension record is associated with a data mart associated with the target dimension table.

21. The computer-readable data transmission medium of claim 14, wherein generated target dimension tables are shared by different output data marts.

22. The computer-readable data transmission medium of claim 14, wherein each aggregated fact data record is generated only once and then output to the output data marts requiring the aggregate fact data record.

23. The computer-readable data transmission medium of claim 14, wherein different output data marts have specified that corresponding dimension records should be merged to the same target dimension table.

24. The computer-readable data transmission medium of claim 14, wherein users can choose the dimension records to be output to the generated target dimension tables.

25. The computer-readable data transmission medium of claim 14, wherein a dimension output filtering flag can be used to output the dimension records.

26. The computer-readable data transmission medium of claim 25, wherein the dimension output filtering flag is at least one of a group consisting of:
- no dimension output;
- all dimension records;
- active in data mart; and
- ever active in data marts.

* * * * *

UNITED STATES PATENT AND TRADEMARK OFFICE
CERTIFICATE OF CORRECTION

PATENT NO. : 6,850,952 B2
DATED : February 1, 2005
INVENTOR(S) : Eva Man-Yan Tse et al.

It is certified that error appears in the above-identified patent and that said Letters Patent is hereby corrected as shown below:

Title page,
Item [56], References Cited, OTHER PUBLICATIONS, add -- The Data Warehouse Toolkit; Ralph Kimball, Author; John Wiley & Sons, Publisher; Chapter 13: Aggregates; 1996 --;
add -- Planning and Designing the Data Warehouse; Ramon Barquin and Herb Edelstein, Editors; Prentice Hall PTR, Publisher; Chapter 9: Database Design for Data Warehouses: The Basic Requirements; pp. 194-197; 1997 --;
add -- Building, Using, and Managing the Data Warehouse; Ramon Barquin and Herb Edelstein, Editors; Prentice Hall PTR, Publisher; p. 10, figs. 1-2: where aggregation fits; 1997 --;
add -- www.prismsolutions.com/news_info/corp_capabilities6.html - Corporate Capabilities --; and
add -- www.pathfinder.com/money/latest/press/PW/1998Sep01/248.html --.

Item [74], *Attorney, Agent, or Firm*, replace "Steven B. Kelber; Piper Rudnick LLP" with -- Fish & Richardson P.C. --.

Signed and Sealed this

Sixteenth Day of August, 2005

JON W. DUDAS
*Director of the United States Patent and Trademark Office*